US008625485B2

(12) United States Patent
Lee et al.

(10) Patent No.: US 8,625,485 B2
(45) Date of Patent: Jan. 7, 2014

(54) DATA FLOW ROUTING IN A MULTI-HOP WIRELESS NETWORK

(76) Inventors: Sung-Ju Lee, San Francisco, CA (US); JeongKeun Lee, Palo Alto, CA (US)

( * ) Notice: Subject to any disclaimer, the term of this patent is extended or adjusted under 35 U.S.C. 154(b) by 1251 days.

(21) Appl. No.: 12/433,718

(22) Filed: Apr. 30, 2009

(65) Prior Publication Data

US 2010/0278102 A1    Nov. 4, 2010

(51) Int. Cl.
*H04W 4/00* (2009.01)
*G06F 15/173* (2006.01)

(52) U.S. Cl.
USPC ............................. 370/328; 709/238; 709/239

(58) Field of Classification Search
USPC ........................................................ 370/328
See application file for complete search history.

(56) References Cited

U.S. PATENT DOCUMENTS

| | | | | |
|---|---|---|---|---|
| 6,928,484 | B1 * | 8/2005 | Huai et al. ..................... | 709/239 |
| 7,159,035 | B2 * | 1/2007 | Garcia-Luna-Aceves et al. .............................. | 709/241 |
| 7,362,727 | B1 * | 4/2008 | O'Neill et al. ................ | 370/331 |
| 7,471,633 | B2 * | 12/2008 | Yarvis et al. .................... | 370/238 |
| 7,729,260 | B2 * | 6/2010 | Larsson et al. ................ | 370/238 |
| 7,961,626 | B2 * | 6/2011 | Reeve ............................ | 370/238 |
| 8,335,164 | B2 * | 12/2012 | Liu ................................ | 370/252 |
| 2002/0101822 | A1 * | 8/2002 | Ayyagari et al. .............. | 370/235 |
| 2003/0193898 | A1 * | 10/2003 | Wong et al. .................... | 370/252 |
| 2006/0007882 | A1 * | 1/2006 | Zeng et al. ..................... | 370/328 |
| 2007/0070909 | A1 * | 3/2007 | Reeve ............................ | 370/238 |
| 2007/0147254 | A1 * | 6/2007 | Larsson et al. ................ | 370/238 |
| 2007/0195702 | A1 * | 8/2007 | Yuen et al. .................... | 370/238 |
| 2009/0147722 | A1 * | 6/2009 | Ramachandran ............. | 370/315 |
| 2009/0175172 | A1 * | 7/2009 | Prytz et al. .................... | 370/238 |
| 2009/0207777 | A1 * | 8/2009 | Stamoulis et al. ............ | 370/315 |

OTHER PUBLICATIONS

Royer, E. et al., "A Review of Current Routing Protocols for Ad-Hoc Mobile Wireless Networks", IEEE Personal Communications Magazine, Apr. 1999.
De Couto, D. et al., "A HighThroughput Path Metric for MultiHop Wireless Routing", Proceedings of ACM MobiCom 2003.
Draves, R. et al., "Routing in multi-radio, multi-hop wireless mesh networks", Proceedings of ACM MobiCom 2004.
Pearlman, M. R. et al., "On the impact of alternate path routing for load balancing in mobile ad hoc networks",Proceedings of ACM MobiHoc 2000.
Lee, S. et al., "AODV-BR: Backup Routing in Ad hoc Networks", Proc. of IEEE WCNC 2000.
Lee, S. et al., "Split Multipath Routing with Maximally Disjoint Paths in Ad hoc Networks", Proc. of IEEE ICC 2001.
Raju, J. et al., "A New Approach to On-demand Loop-Free Multipath Routing", Proceedings of IEEE ICCCN 1999.
Marina, M.K. et al., "On-demand Multipath Distance Vector Routing for Ad Hoc Networks", Proceedings of IEEE ICNP 2001.
Mosko, M. et al., "Multipath routing in wireless mesh networks", Proceedings of IEEE WiMesh 2005.

* cited by examiner

*Primary Examiner* — Guang Li

(57) ABSTRACT

A data flow from a source to a destination is routed in a multi-hop wireless network. Nodes are searched in the multi-hop wireless network for information of route metrics for the nodes, the information of the route metrics are received, a route that has a most optimal route metric for the data flow are determined based on the route metrics and a data flow metric of the data flow, and the data flow are received from the source via the route at the destination in the multi-hop wireless network.

16 Claims, 5 Drawing Sheets

1

DATA FLOW ROUTING IN A MULTI-HOP WIRELESS NETWORK

RELATED APPLICATIONS

The present application is related to U.S. patent application Ser. No. 12/433,644, entitled "Selecting An Access Point In A Wireless Network Using A Data Flow Metric", by Sung-Ju Lee and JeongKeun Lee, which is incorporated by reference in its entirety.

BACKGROUND

In typical wireless networks such as cellular networks or infrastructure-based Wireless Local Area Networks (WLANs), wireless routing is simple because only the last hop is wireless. However, in multi-hop wireless networks, routing has a much important role for data communications because data is sent via multiple wireless hops instead of a single hop. Thus, routing in a multi-hop wireless network versus a last-hop wireless transmission has a much greater chance of affecting the data communications. A data flow includes information, which may be for one application or service. The source and destination can send or receive data flows via the route and the data flows may pass through the route to the Internet or another network.

Conventionally, all the data flows in a multi-hop wireless network are provided via a single route to the source or the destination. A data flow includes information, which may be for one application or service. When the route from a specific source to a specific destination degrades, such as due to mobility or interference, all the data flows using that route may use another route if the multi-hop wireless network supports another route. The new route selection may be performed using a single metric, and all the data flows have to use the new route. However, different data flows may benefit from different routes because different routes may provide different performance for different metrics. For example, a route may be selected that has the greatest bandwidth, but that route may not be the best route for a data flow that benefits from a route that has the smallest latency. Thus, a single route in the multi-hop wireless network may not provide the best performance for different types of data flows. At least one data flow may suffer performance degradation even though another data flow may benefit from the new route.

BRIEF DESCRIPTION OF THE DRAWINGS

Features of the present invention will become apparent to those skilled in the art from the following description with reference to the figures, in which.

DETAILED DESCRIPTION

Figure 1:
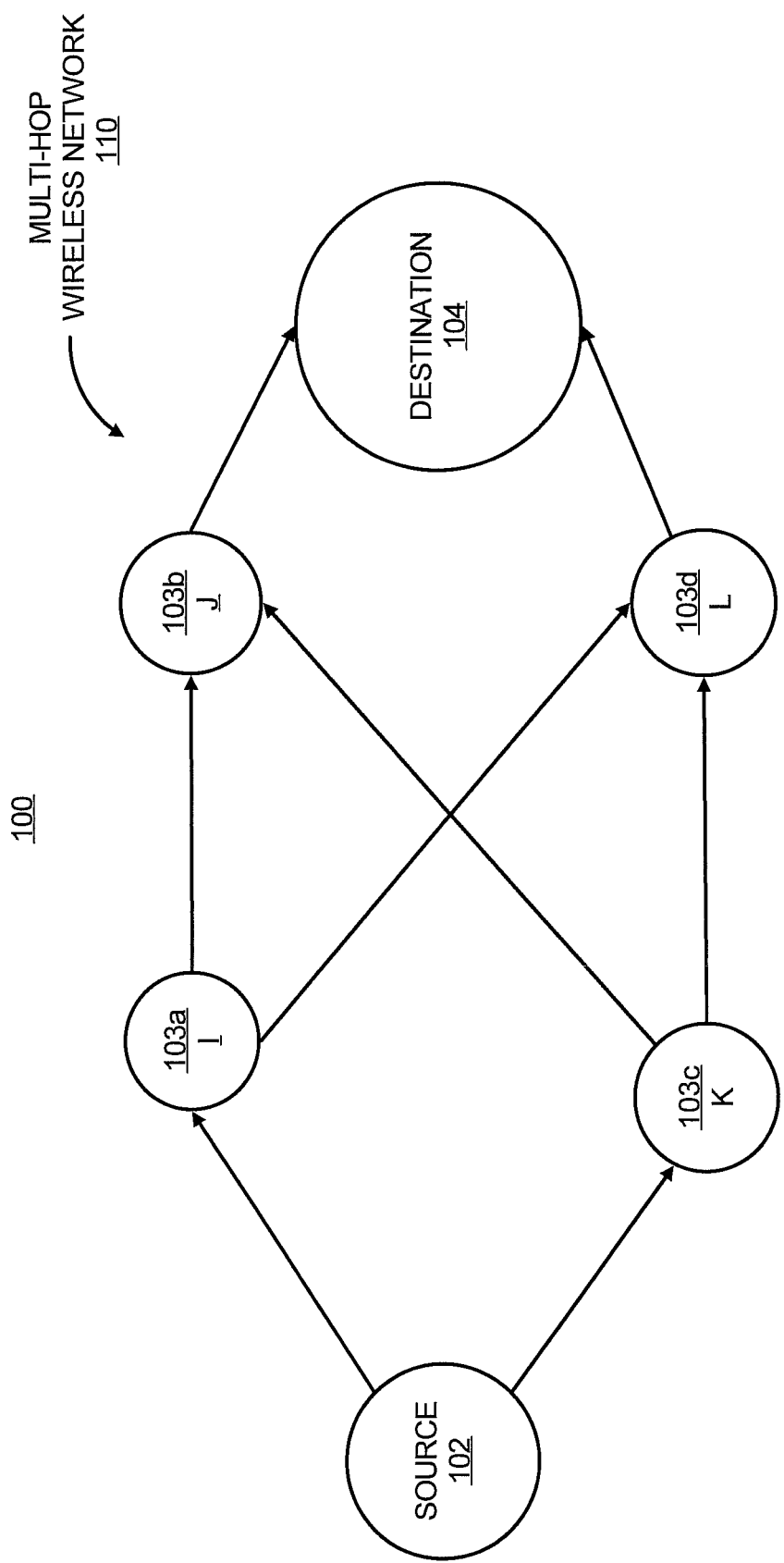
FIG. 1 shows a simplified block diagram of a system including a multi-hop wireless network, according to an embodiment of the present invention.

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

In an embodiment of the present invention, different routes are used for different type of data flows simultaneously based on metrics that provide the best performance for each type of data flow and the condition of the routes. Different route metrics are used for a source or a destination to select different routes for different data flows. A route metric is a metric representing a condition of a route. Examples include received signal strength, bandwidth (throughput), latency, loss rate, etc. A route is multi-hop route from a source to a destination in the multi-hop wireless network. Multi-hop means that a signal can move from node-to-node and then finally to the source or the destination. Multi-hop wireless network allows for continuous connections and reconfiguration by "hopping" from one node to another node until the destination is reached. When nodes are all connected to each other in a multi-hop wireless network, it is a fully connected network. Here, examples of nodes are a router and a mesh node. Also, a source or a destination is a node. The nodes can all connect to each other via multiple hops. Thus, the nodes are operable to be used as hops.

The source or the destination selects the best route for each data flow based on a data flow metric for the data flow. The data flow metric is a metric that is determined to have a greatest or one of the greatest impacts on the data flow. When the source or the destination needs to find a route to send or receive a data flow via the route, it searches the nodes in the multi-hop wireless network to obtain information about the route metrics in the multi-hop wireless network. The route metrics may be measured between two different nodes in the network. A node is a network device, such as a router, hub, a laptop, a mobile phone, and a personal digital assistant (PDA). The information of route metrics may include values (e.g., measurements) for the route metrics. The source or the destination obtains the values for each route metric.

When the route metrics are gathered, the source or the destination store this information, and when a new data flow arrives, the source or the destination selects a route that provides the best performance for a data flow using the information of the route metrics. Each type of data flow is associated with a data flow metric that identifies which data flow metric is most important for quality of service (QoS) for that type of data flow. Then, a route is selected that provides the best performance for the data flow metric. For instance, for data flows such as Voice over IP (VoIP) or interactive network games, the source or the destination selects a route that provides the minimum delay, as those flows are delay sensitive. For flows that require high bandwidth, such as a file download, it will be best to select the route that provides the largest bandwidth (i.e., bandwidth is the data flow metric for the file download data flow). If reliability is the most important metric for a data flow (e.g., I-frames of MPEG video), the source or the destination selects a route with the lowest loss rate. What has been described above is proactive routing because routes can be selected for different data flow metrics prior to receiving a data flow, according to an embodiment of the present invention. In this embodiment, when a new data flow arrives, this new data flow is routed along the route that provides the best quality in terms of the metric that is the most important to the data flow.

In an embodiment, data-flow-based, on-demand routing is implemented. For on-demand routing, the route is built when it is needed. The source finds a route when there is a data flow to send by sending a route request packet to the destination via all possible routes in the network. The intermediate nodes, which are not the destination, forward this packet with the route metric information attached. When the destination receives multiple copies of this packet that took different routes, it selects the best route for a specific data flow, and notifies the source of its selection. The intermediate nodes may include multiple route metrics. The destination selects the best route for the data flow metric, and notifies the source of the route. Here, multiple notification packets may need to be sent when different routes are selected for different data flow metrics. When a new data flow arrives with the same data flow metric, the source will have a route available to use. In another embodiment, a route request packet is sent to the destination via all possible routes in the network whenever a new data flow with a different data flow metric arrives at the source. Then the intermediate nodes will only need to include the information route metrics of interest, which are the route metrics that include measurements for the data flow metric for that particular data flow.

In addition, the source or the destination may obtain the route information whenever it needs to re-send or receive a data flow as the associated route no longer provides the required performance. Associating or re-associating a source or the destination with a route includes the source or the destination selecting a new route to send or receive a data flow. The source or the destination can use a route list as potential routes to associate with the data flow. As the source or the destination associate with different routes for different data flows, instead of associating with only one route for all data flows, the quality of service for each data flow improves. The methods described herein are not limited to be applied only to a multi-hop WLAN. The methods can also be applied to other wireless networks, such as Worldwide Inter-operability for Microwave Access (WiMax) networks or other types of wireless networks.

FIG. 1 illustrates a block diagram of a system 100 including a multi-hop wireless network 110, according to an embodiment of the present invention. The system 100 includes the multi-hop wireless network 110. The multi-hop wireless network 110 may be connected to an access network or any wide area network (WAN) or other network.

The multi-hop wireless network 110 includes a source 102 (S), multiple wireless routers as nodes, shown as wireless routers 103a (I), 103b (J), 103c (K) and 103d (L), and a destination 104 (D). The source 102 and the destination 104 are also nodes, as they could be intermediate nodes forwarding data flows for other source or destination in the network. More or less than four wireless routers, more sources and more destinations may exist in the multi-hop wireless network 110. However, only the limited numbers of network devices are shown for illustration purposes.

The source 102 receives a data flow from another network or just originates a data flow, such as a VoIP call. The source 102 also sends a data flow to the destination 104 via different routers, such as the routers 103a-d. The wireless routers 103a-d may be equipped for interfacing with the source 102, the destination 104, and another network outside the multi-hop wireless network 110. The wireless routers 103a-d are also nodes of the multi-hop wireless network 110 that route data flows within the multi-hop wireless network 110. The destination 104 may be a device and may include an end user device, such as a laptop, cell phone, etc. The destination 104 receives a data flow from the source 102 via the routers 103a-d.

In FIG. 1, the source 102 and the destination 104 are wirelessly connected to the wireless routers 103a-103d. The source 102 or the destination 104 may be connected to each other via one or more of the wireless routers 103a-103d to send and receive data flows.

For example, the source 102 or the destination 104 may send and receive different types of data flows via different wireless routers 103a-d. A sequence of different wireless routers makes a route. For example, from the source 102 to the destination 104, there are several different routes that a data flow can take. First, a data flow can travel via the wireless router 103a (I) and the wireless router 103b (J) to the destination 104 from the source 102 (Route 1). Second, a data flow can travel via the wireless router 103a (I) and the wireless router 103d (L) to the destination 104 from the source 102 (Route 2). Third, a data flow can travel via the wireless router 103c (K) and the wireless router 103d (L) to the destination 104 from the source 102 (Route 3).

Examples of types of data flows are VoIP, multiplayer game data, streaming video or audio, or bulk transfer of data. Each type of data flow is associated with a particular data flow metric, such as signal strength, latency, bandwidth, loss rate, etc. Each wireless router of the wireless routers 103a-d measures or otherwise determines route metrics between two different routers. For example, routers 103a and 103b measure route metrics between each other. Similarly, routers 103a and 103d measure route metrics between each other. Each pair of nodes that may form a hop in a route determines route metrics between each other.

The route metrics may be the same as the data flow metrics, so the route metric values can be used to select a route for different data flows based on their data flow metrics of the data flows. For example, if the data flow metric is latency, measured latency values for a latency route metric are used to identify the best routers for a route for the data flow.

Table 1 shows examples of route metric values for the routes, route 1 (S→I→J→D), route 2 (S→I→L→D), and route 3 (S→K→L→D).

TABLE 1

|  | Route 1 (S→I→J→D) | Route 2 (S→I→L→D) | Route 3 (S→K→L→D) |
| --- | --- | --- | --- |
| Delay (ms) | 90 | 120 | 100 |
| BW (Mbps) | 45 | 45 | 60 |
| Loss rate (%) | 15 | 5 | 20 |

Here, route 1 has the shortest delay, route 2 has the least loss rate, and route 3 has the highest bandwidth. Thus, it is advantageous for the destination 104 to select route 1 for receiving a data flow that has delay as its data flow metric, such as a VoIP data flow. Route 2 may be selected for a loss rate data flow metric (e.g., mpeg i-frames), and route 3 may be selected for a bandwidth data flow metric (e.g., such as a large file download dataflow).

The source 102 or the destination 104 may have interfaces for receiving one or more data flows. The interfaces may include radios for sending and receiving data for the data flows. The source 102 or the destination 104 uses its interfaces to communicate via each route. In this example, there is at least one route within range of the source or the destination and each route includes information including route metrics or the values of the route metrics of each route. As shown in table 1, examples of the values of the route metrics of each route are 90 ms delay, 45 Mbps bandwidth, and 15% of a loss rate for route 1, and so on.

Figure 2:
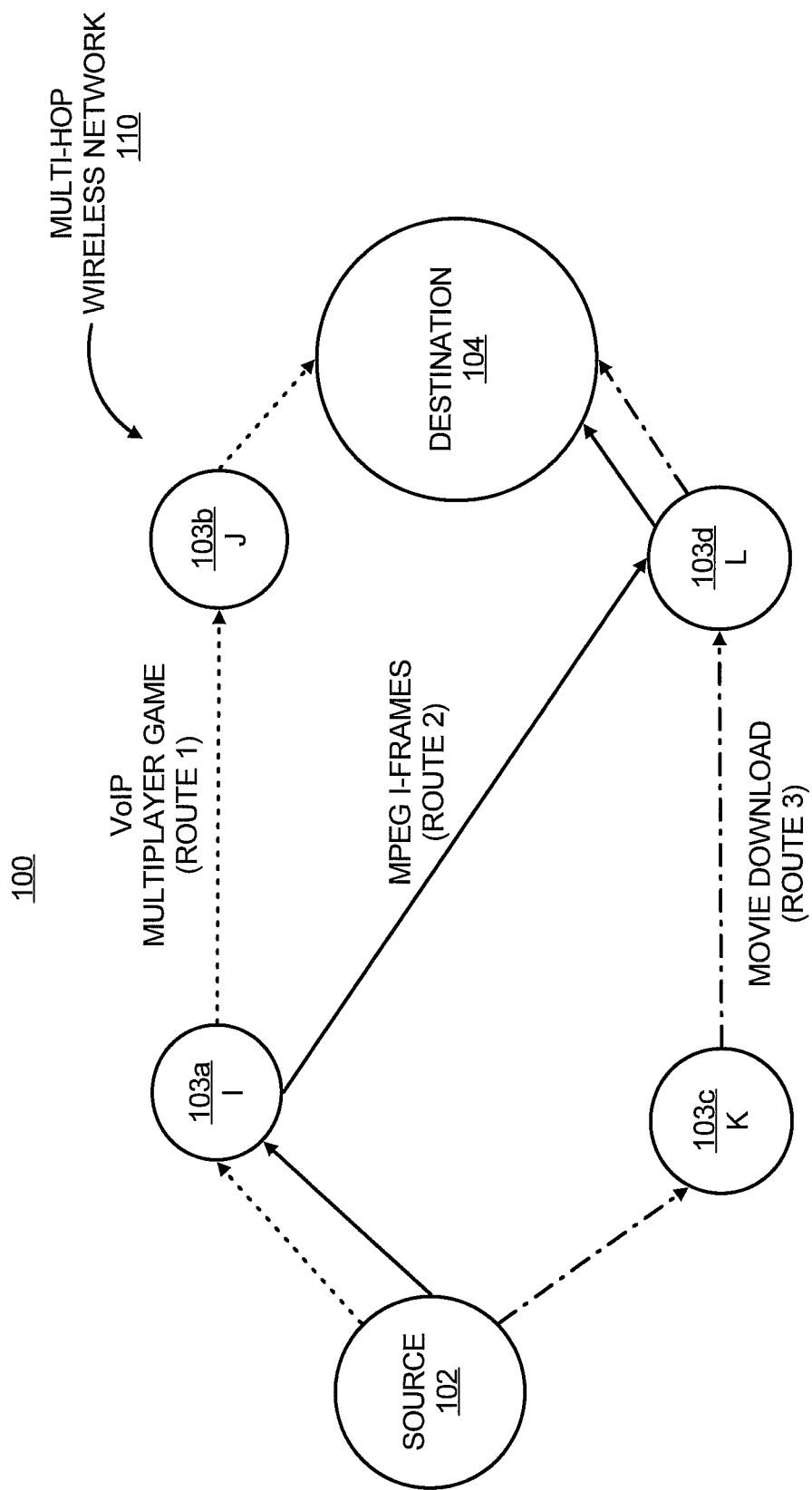
FIG. 2 shows a diagram for routing a data flow from a source to a destination in a multi-hop wireless network, according to an embodiment of the present invention.

FIG. 2 shows a diagram of the system 100 of FIG. 1 using data flow based routing from a source to a destination in a multi-hop wireless network, according to an embodiment of the present invention.

In this example, there are three data flows including MPEG I-frames, VoIP, and downloading a movie file between the source 102 and the destination 104. The source 102 and the destination 104 are operable to send/receive multiple data flows via different routes simultaneously. In that case, different routes may be selected that different route has the best route metric for the different data flows.

In one embodiment, routes to all other nodes in the multi-hop wireless network is maintained by measuring multiple route metrics and including the measured multiple route metrics in the periodic routing messages. Each node searches for neighboring nodes and may store route metrics information of the other nodes. The route metrics for different pairs of nodes, such as for 'node 103a and 103b' or for 'node 103a and 103d' are measured and used to decide a route metric for the different routes between the source and the destination, such as routes 1, 2, and 3 in this example. Here, the information of the route metrics between two different nodes is received and stored periodically.

For different data flows, the route metrics for different hops and the data flow metrics of different data flows are compared to identify the route that should provide the best performance or quality of service for a particular data flow. The nodes including the nodes 103a-d, the source 102, and the destination 104 may store a data flow metric for different type of data flows.

For example, the data flow metrics for the MPEG I-frames, VoIP, and movie file download data flows are loss rate, delay and bandwidth, respectively. The source 102 seeks a route that has a least loss rate, a route that has a least delay, and a route that has a highest bandwidth. When the source 102 receives the information including the values of different route metrics of different routes, the source 102 finds that route 1 has the best route metric value for the delay, route 2 has the best route metric value for the loss rate, and route 3 has the best route metric value for the bandwidth. Thus, the source 102 selects route 1 for the VoIP, route 2 for the MPEG I-frames, and route 3 for the movie download.

In another embodiment, a route that provides the best route metric for a data flow is selected only when it is needed to receive the data flow. The source 102 finds a route when there is a data flow to send, by flooding the multi-hop wireless network 110 with a route request packet (not shown). The flooding may be performed by sending a plurality of route request packets to the destination 104 via different routes, such as routes 1, 2, and 3 in this example in the multi-hop wireless network 110. The plurality of route request packets may have the plurality of the same route request packets, but just multiple copies of the same route request packet with same ID.

The destination 104 receives the plurality of route requests packets that took different routes, and determines route metrics for different routes. Here, the intermediate nodes, such as the node 103a-d may include different route metric information. The destination 104 selects a route that has the most optimal performance for the data flow metric for a specific data flow. Then, the source 102 receives the selected route from the destination 104. The source 102 may receive the selected route by receiving notification packets from the destination 104. The source 102 then sends the specific data flow to the destination 104 via the route of the destination's choice. Here, multiple notification packets might need to be sent to the source 102 when different routes are selected for different data flows. In another embodiment, the route request packet flooding may be performed whenever a new data flow with different data flow metric arrives at the source 102. The intermediate nodes, such as the node 103a-d will only need to include the information of route metric of interest.

Figure 3:
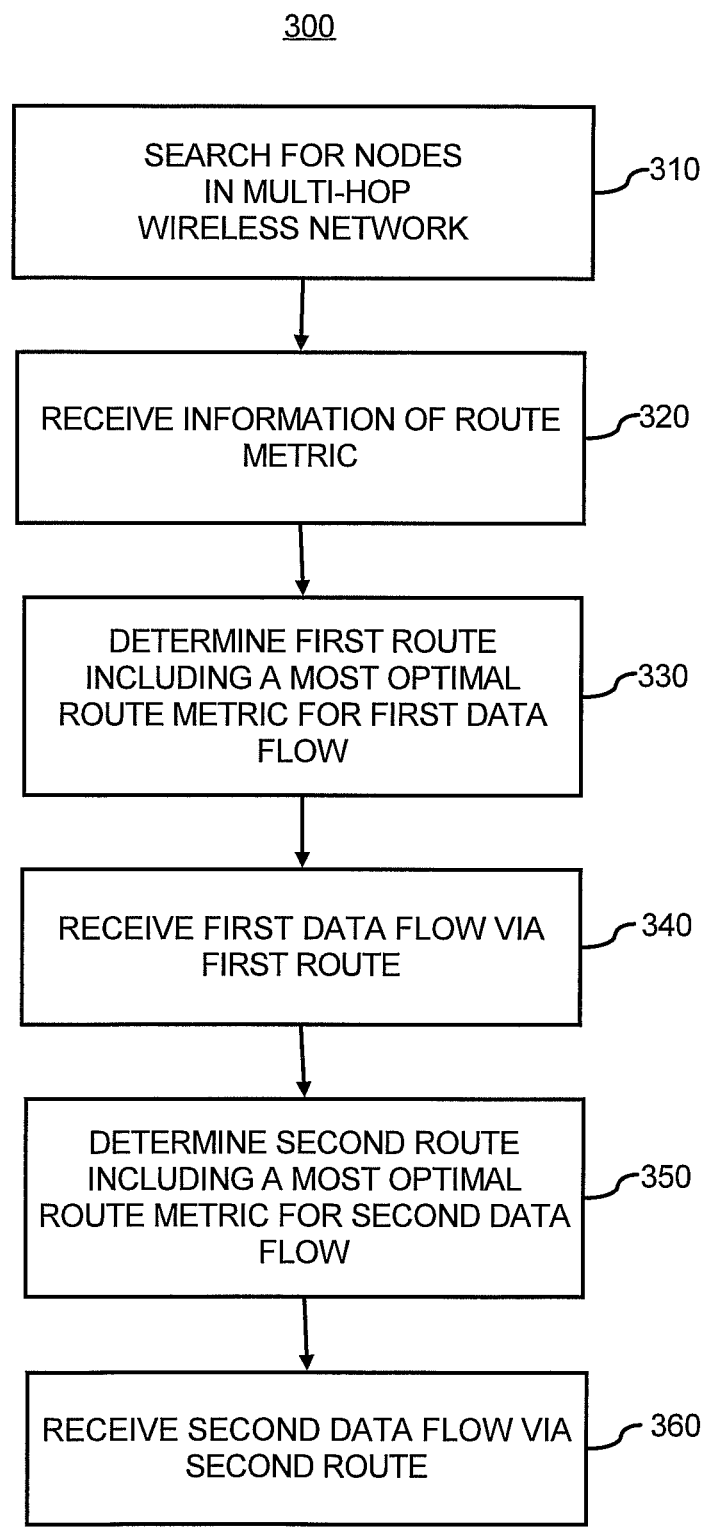
FIG. 3 illustrates a flowchart of a method for proactive routing, according to an embodiment of the present invention.

FIG. 3 illustrates a flow chart of a method 300 for proactive routing in a multi-hop wireless network, according to an embodiment. The method 300 and other methods described herein are described with respect to the system 100 by way of example, and the methods may be practiced in other systems. Also, it should be apparent to those of ordinary skill in the art that the method 300 and for other methods described herein that other steps may be added or existing steps may be removed, modified or rearranged.

At step 310, the nodes in the multi-hop wireless network 110 are searched. This can be done by periodically sending route update information of the link to only its neighbor nodes by each node in the entire network. This can also be done by periodically sending information of the routes to all other nodes in the network by each node in the network.

At step 320, information of one or more route metrics is received. For example, each node sends its node ID and route metrics measured between itself and an adjacent node. Thus, each of the nodes 103a-d receives route metrics for hops that are operable to be used for a route between the source 102 and the destination 104. Note that the destination 104 has at least one interface that is used for communicating with each router.

At step 330, a first route that has a most optimal route metric for a first data flow is determined based on the route metrics received from the nodes and a first data flow metric of the first data flow. Here the type of the route metric from the first route should match the type of the first data flow metric. For example, if the route metrics received for route 2 include bandwidth, delay and loss rate, the nodes use the loss rate route metric values to determine whether route 2 should be selected to receive a multimedia streaming data flow because the data flow metric for this data flow is loss rate.

At step 340, the destination 104 receives the first data flow from the source via the first route in the multi-hop wireless network.

At step 350, a second route that has a most optimal route metric for a second data flow is determined based on one or more route metric and a second data flow metric of the second data flow. Again, the type of the route metric from the second route should match the type of the second data flow metric.

Finally, at step 360, the destination 104 receives the second data flow from the source via the second route in the multi-hop wireless network. Here, the type of the second data flow metric may be different from the type of the first data flow metric. The data flows may be received simultaneously.

The steps 330 and 350 describe using one data flow metric per data flow to select a route for a data flow. However, in other embodiments, a type of data flow may have multiple data flow metrics that are used to select a route to receive a data flow.

Figure 4:
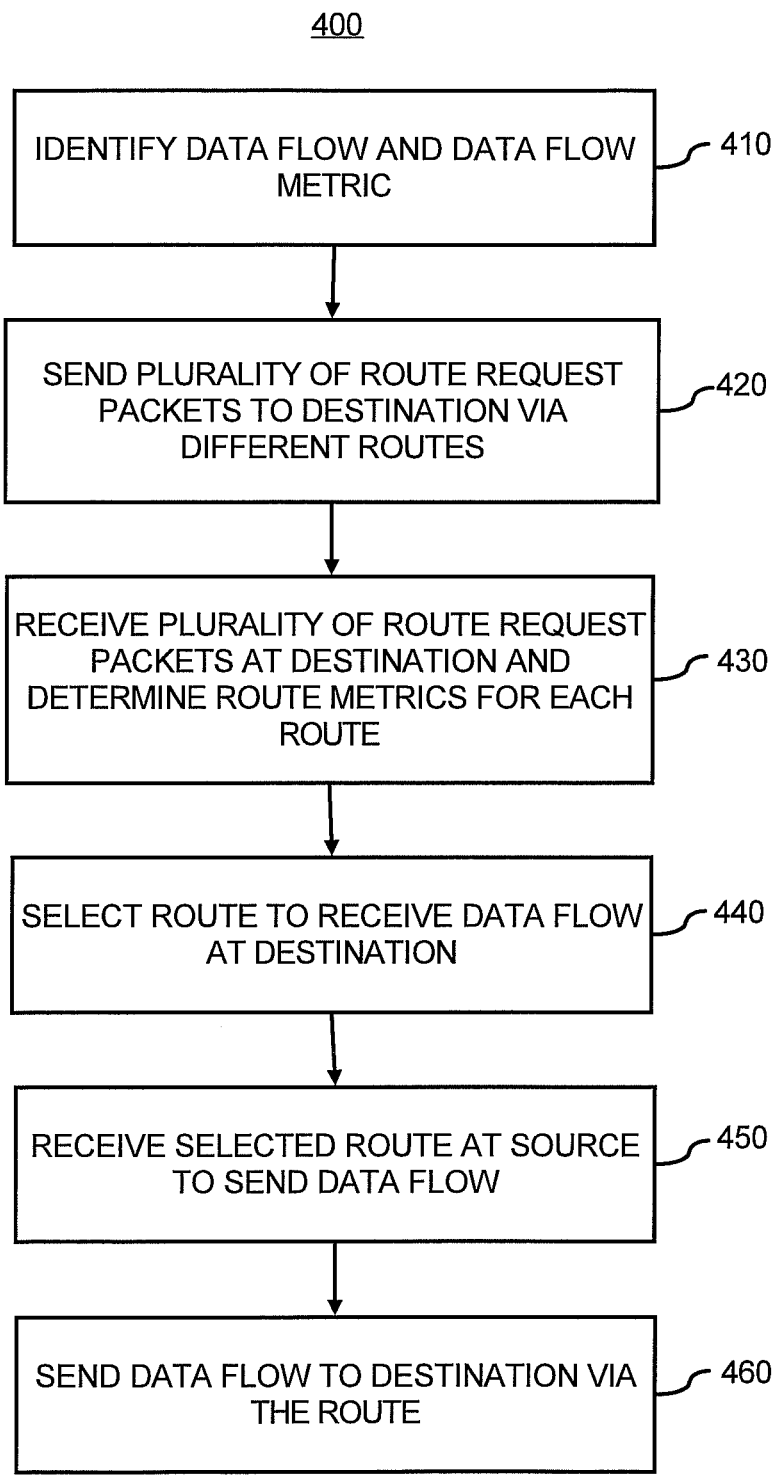
FIG. 4 illustrates a flowchart of a method for on-demand routing, according to an embodiment of the present invention.

FIG. 4 illustrates a flowchart of a method 400 for on-demand routing a data flow in a multi-hop wireless network, according to an embodiment of the present invention.

At step 410, the source 102 identifies a data flow and a corresponding data flow metric for the data flow. For example, a data flow is received at the source 102 and needs to be sent to the destination a source At step 420, the source 102 sends a plurality of route request packets to the destination 104 via different routes in the multi-hop wireless network. In one example, the source 102 floods the route request packets.

At step 430, the destination 104 receives the route requests packets, and determines route metrics for each route. For example, as a request packet is routed to the destination 104, at each hop a node includes route metrics for the hop and sends the packet towards the destination 104.

At step 440, the destination 104 selects a route that has the most optimal performance for the data flow metric for the data flow. The route metrics from step 430 are used to select the route. For example, the route that has the shortest delay is selected for a VoIP data flow.

At step 450, the source 102 receives the selected route from the destination 104 to send the data flow via the route. The received route may identify the nodes in the route. The route that the source 102 receives includes the most optimal route metric (e.g., shortest delay) for the data flow based on the data flow metric.

At step 460, the source 102 sends the data flow to the destination 104 via the route in the multi-hop wireless network.

Figure 5:
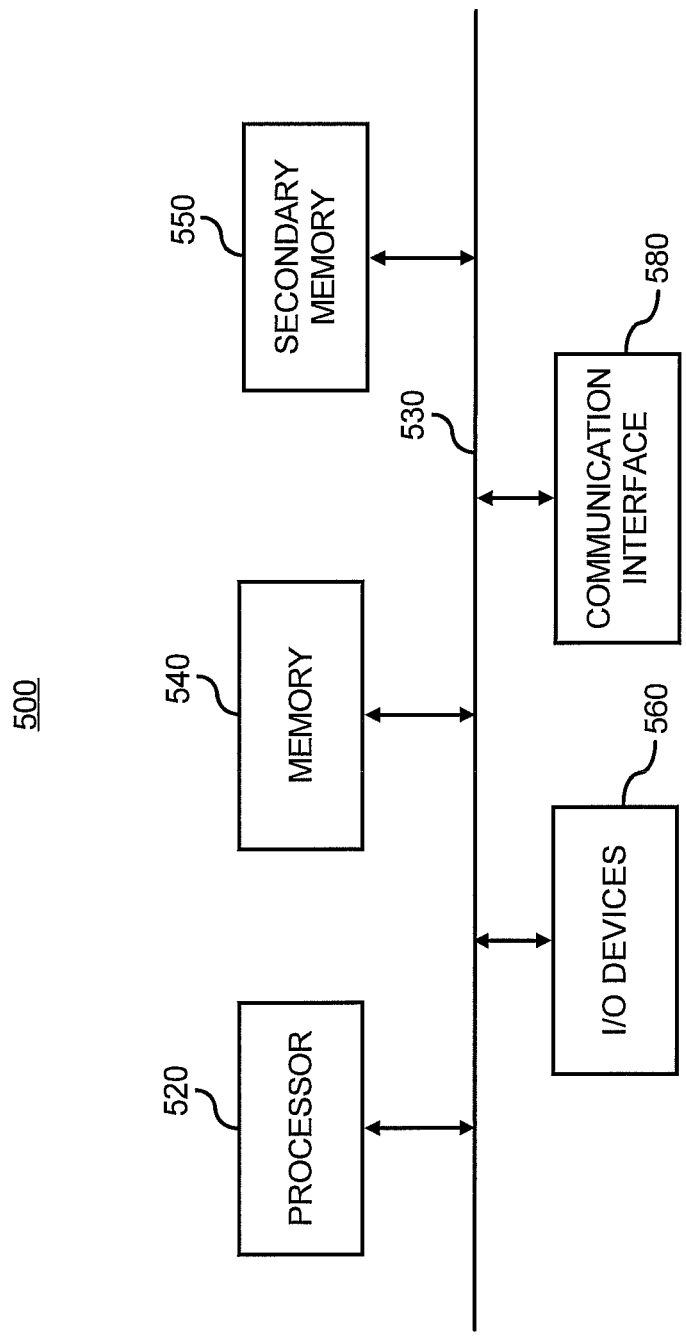
FIG. 5 shows a block diagram of a computer system that may be used as a platform for devices shown in FIG. 1, according to an embodiment of the present invention.

FIG. 5 shows the block diagram of a computer system 500 that may be used as a platform for a device configured to receive a data flow at a source or the destination from a route in a wireless network. The computer system 500 may also be used to execute one or more computer programs performing the methods, steps and functions described herein. The computer programs are stored in computer storage mediums.

In one embodiment, the components of the computer system 500 in FIG. 5 can be grouped into subsystems. These flow-based subsystems interact with other devices throughout the system, including source or the destinations and the routers in between, to transfer and route the data flows within the wireless network, such as the multi-hop wireless network 110 in FIG. 1.

The computer system 500 includes a processor 520, providing an execution platform for executing software. The processor 520 is configured to search nodes for information of at least one route metric for the nodes. The processor 520 is further configured to receive information of a route metric, determine a first route that has a most optimal route metric for a first data flow based on the route metric and a first data flow metric of the first data flow, determine a second route that has a most optimal route metric for a second data flow based on the route metric and a second data flow metric of the second data flow, and receive the first data flow via the first route and the second data flow via the second route from the source.

Commands and data from the processor 520 are communicated over a communication bus 530. The computer system 500 also includes a main memory 540, such as a Random Access Memory (RAM), where software may reside during runtime, and a secondary memory 550. The secondary memory 550 may include, for example, a nonvolatile memory where a copy of software is stored. In one example, the secondary memory 550 also includes ROM (read only memory), EPROM (erasable, programmable ROM), EEPROM (electrically erasable, programmable ROM), and other data storage devices, include hard disks. The main memory 540 as well as the secondary memory 550 may store the route metric, the first data flow metric, the second data flow metric, the first data flow, and the second data flow as discussed before.

The computer system 500 includes I/O devices 560. The I/O devices 560 may include a display and/or user interfaces comprising one or more I/O devices, such as a keyboard, a mouse, a stylus, speaker, and the like. A communication interface 580 is provided for communicating with other components. The communication interface 580 may be a wireless interface. The communication interface 580 may be a network interface. The communication interface 580 is configured to receive the route metric, the first data flow metric, the second data flow metric, the first data flow, and the second data flow.

Some or all of the operations set forth in the methods and functions described herein may be contained as one or more computer programs stored in any desired computer readable storage medium and executed by a processor on a computer system. Exemplary computer readable storage media that may be used to store the software and may include Random Access Memory (RAM), Read Only Memory (ROM), Electrically Programmable Read Only Memory (EPROM), Electrically Erasable Programmable Read Only Memory (EEPROM), hard disks, or other data storage devices.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. At least one non-transitory computer readable storage medium including instructions that when executed by a computer system performs a method for routing a data flow from a source to a destination in a multi-hop wireless network, the method comprising:
    searching nodes in the multi-hop wireless network for information of route metrics for the nodes wherein the route metrics comprise at least one of signal strength, latency, bandwidth, and loss rate;
    receiving the information of the route metrics from the nodes in the multi-hop wireless network;
    identifying a first data flow metric for a first data flow based on a type of the first data flow;
    determining a first route that provides an optimal performance for the first data flow based on the route metrics and the first data flow metric for the first data flow; and
    receiving the first data flow from the source via the first route in the multi-hop wireless network.

2. The at least one non-transitory computer readable storage medium of claim 1, wherein the method further comprises:
    identifying a second data flow metric for a second data flow based on a type of the second data flow, wherein the type of the second data flow is different from the type of the first data flow;
    determining a second route that provides an optimal performance for the second data flow based on the route metrics and the second data flow metric for the second data flow; and
    receiving the second data flow from the source via the second route in the multi-hop wireless network.

3. The at least one non-transitory computer readable storage medium of claim 2, wherein the method further comprises:
    receiving the first data flow from the source via the first route and receiving the second data flow from the source via the second route simultaneously in the multi-hop wireless network.

4. The at least one non-transitory computer readable storage medium of claim 2, wherein the nodes in the multi-hop wireless network are to be used as hops for the first route and the second route.

5. The at least one non-transitory computer readable storage medium of claim 1, wherein the information of the route metrics between two different nodes is received periodically.

6. The at least one non-transitory computer readable storage medium of claim 1, wherein the method further comprises:
   storing the information of the route metrics in a data storage device.

7. The at least one non-transitory computer readable storage medium of claim 1, wherein the first data flow metric comprises at least one of maximum signal strength, minimum latency, maximum bandwidth, and minimum loss rate.

8. The at least one non-transitory computer readable storage medium of claim 1, wherein the type of the first data flow comprises at least one of Voice over IP, streaming video, streaming audio, and a bulk transfer of data.

9. At least one non-transitory computer readable storage medium including instructions that when executed by a computer system performs a method for routing a data flow from a source to a destination in a multi-hop wireless network, the method comprising:
   identifying at the source a first data flow and a corresponding data flow metric for the first data flow based on a type of the first data flow;
   sending from the source a plurality of route request packets to the destination via different routes;
   receiving at the source a route from the destination to send the first data flow via the route, wherein the route is selected by the destination based on route metrics of each of the different routes to the destination and based on the data flow metric for the first data flow to provide an optimal performance for the first data flow, wherein the route metrics comprise at least one of signal strength, latency, bandwidth, and loss rate; and
   sending the first data flow from the source to the destination via the selected route in the multi-hop wireless network.

10. The at least one non-transitory computer readable storage medium of claim 9, wherein the method further comprises:
    receiving at the source a second route from the destination to send a second data flow via the second route, wherein the second route provides an optimal performance for the second data flow based on a data flow metric for the second data flow; and
    sending the second data flow from the source to the destination via the second route in the multi-hop wireless network, wherein a type of the second data flow is different from a type of the first data flow.

11. The at least one non-transitory computer readable storage medium of claim 9, wherein a type of the route metrics matches a type of the data flow metric.

12. The at least one non-transitory computer readable storage medium of claim 9, wherein the data flow metric for the first data flow comprises at least one of maximum signal strength, minimum latency, maximum bandwidth, and minimum rate loss.

13. The at least one non-transitory computer readable storage medium of claim 9, wherein the type of the first data flow comprises at least one of Voice over IP, streaming video, streaming audio, and a bulk transfer of data.

14. A computer system to route a data flow from a source to a destination in a multi-hop wireless network, the computer system comprising:
    a processor to:
       search nodes in the multi-hop wireless network for information of a route metric for the nodes, wherein the route metric comprises at least one of signal strength, latency, bandwidth, and loss rate,
       receive information of the route metric from the nodes in the multi-hope wireless network,
       identify a first data flow metric for a first data flow based on a type of the first data flow;
       identify a second data flow metric for a second data flow based on a type of the second data flow, wherein the type of the first data flow is different from the type of the second data flow;
       determine a first route that provides an optimal performance for the first data flow based on the route metric and the first data flow metric for the first data flow,
       determine a second route that provides an optimal performance for the second data flow based on the route metric and the second data flow metric of the second data flow, and
       receive the first data flow via the first route and the second data flow via the second route from the source;
    an interface to receive the route metric, the first data flow metric, the second data flow metric, the first data flow, and the second data flow; and
    a data storage storing the route metric, the first data flow metric, the second data flow metric, the first data flow, and the second data flow.

15. The computer system of claim 14, wherein the processor is further to receive the first data flow from the source via the first route and receive the second data flow from the source via the second route simultaneously in the multi-hop wireless network.

16. The computer system of claim 14, wherein the information of the route metric between two different nodes is received periodically.

* * * * *